US009141360B1

(12) United States Patent
Chen et al.

(10) Patent No.: US 9,141,360 B1
(45) Date of Patent: Sep. 22, 2015

(54) WEB APPLICATION MODULE TRANSLATION SERVICE (75) Inventors: J. Bradley Chen, Los Gatos, CA (US); Alan A. Donovan, Brooklyn, NY (US); Robert Muth, New York, NY (US); David C. Sehr, Cupertino, CA (US); Bennet Yee, Mountain View, CA (US)

(73) Assignee: Google Inc., Mountain View, CA (US)

(*) Notice: Subject to any disclaimer, the term of this patent is extended or adjusted under 35 U.S.C. 154(b) by 270 days.

(21) Appl. No.: 13/049,631

(22) Filed: Mar. 16, 2011

(51) Int. Cl.
*G06F 9/45* (2006.01)

(52) U.S. Cl.
CPC ... *G06F 8/52* (2013.01); *G06F 8/51* (2013.01)

(58) Field of Classification Search
USPC ............................................. 717/136
See application file for complete search history.

(56) References Cited

U.S. PATENT DOCUMENTS

| | | | |
|---|---|---|---|
| 6,021,275 A | 2/2000 | Horwat | |
| 6,438,573 B1* | 8/2002 | Nilsen | 718/100 |
| 7,246,346 B2 | 7/2007 | Demsey et al. | |
| 7,409,681 B2 | 8/2008 | Graham et al. | |
| 7,761,406 B2* | 7/2010 | Harken | 707/602 |
| 7,912,924 B1* | 3/2011 | Cantrell | 709/219 |
| 7,941,813 B1* | 5/2011 | Protassov et al. | 719/321 |
| 8,078,832 B1* | 12/2011 | Agarwal et al. | 712/13 |
| 8,136,158 B1 | 3/2012 | Sehr et al. | |
| 8,151,349 B1 | 4/2012 | Yee et al. | |
| 8,468,592 B2 | 6/2013 | Sehr et al. | |
| 8,621,619 B2 | 12/2013 | Yee et al. | |
| 8,635,701 B2 | 1/2014 | Hilaiel et al. | |
| 2003/0061602 A1* | 3/2003 | Graham et al. | 717/148 |
| 2005/0243604 A1* | 11/2005 | Harken et al. | 365/185.22 |
| 2005/0273772 A1 | 12/2005 | Matsakis et al. | |
| 2008/0016339 A1* | 1/2008 | Shukla | 713/164 |
| 2009/0100416 A1* | 4/2009 | Brown et al. | 717/153 |
| 2009/0271799 A1* | 10/2009 | Barsness et al. | 718/106 |
| 2009/0282474 A1 | 11/2009 | Chen et al. | |
| 2009/0282477 A1 | 11/2009 | Chen et al. | |
| 2010/0274869 A1* | 10/2010 | Warila et al. | 709/217 |
| 2011/0029820 A1 | 2/2011 | Sehr et al. | |
| 2011/0029961 A1 | 2/2011 | Muth et al. | |
| 2012/0143589 A1 | 6/2012 | Beale et al. | |

(Continued)

OTHER PUBLICATIONS

Donovan et al., "PNaCl: Portable *Native Client* Executables," available to the public on Mar. 17, 2010, through : http://blog.chromium.org/2010/03/native-client-and-web-portability.html, 6 pages.

(Continued)

*Primary Examiner* — John Chavis
(74) *Attorney, Agent, or Firm* — Fish & Richardson P.C.

(57) ABSTRACT

Methods, systems, and apparatus, including computer programs encoded on a computer storage medium, for providing a translation service that generates native object code by translating an intermediate representation of application code in a portable code format. One aspect of the subject matter described in this specification can be embodied in methods that include the actions of receiving a translation service request for a native executable for a particular instruction set architecture from a requestor, where the translation service request includes data specifying portable code in an instruction-set neutral format; obtaining the portable code; translating the portable code into native object code for execution on the particular instruction set architecture; generating a native executable for the particular instruction set architecture; and returning the native executable to the requestor.

51 Claims, 5 Drawing Sheets (56) References Cited

U.S. PATENT DOCUMENTS

2012/0210330 A1* 8/2012 Barsness et al. .............. 718/104
2013/0007698 A1* 1/2013 Warila et al. .................. 717/106
2013/0014274 A1 1/2013 Goodes et al.

OTHER PUBLICATIONS

Sehr et al. "Adapting Software Fault Isolation to Contemporary CPU Architectures," 19th USENIX Security Symposium, Aug. 2010, 11 pages.

Shankland, "Google Seeks to Patent New Web App Tech" Feb. 5, 2010 [online] [retrieved Jul. 31, 2013]. Retrieved from the Internet: http://news.cnet.com/8301-30685_3-20000049-264.html, 4 pages.

Intel, "Profile-guided Optimizations Overview," from Intel C++ Compiler XE 13.1 User and Reference Guides, 2007, 2 pages.

Lattner, Chris, and Vikram Adve. "LLVM: A compilation framework for lifelong program analysis & transformation." Code Generation and Optimization, 2004. CGO 2004. International Symposium on. IEEE, 2004. 12 pages.

* cited by examiner

WEB APPLICATION MODULE TRANSLATION SERVICE

BACKGROUND

This specification relates to translating web application code into security-enhanced native executable code.

One important principle of the web is portability. For example, a typical web page renders and behaves the same way on a browser, regardless of the browser's operating system or the type of hardware it's running on. A conventional technique for ensuring portability is to distribute an intermediate representation of the software module source code that is encoded in a portable code format (i.e., a format that is not specific to any particular instruction set architecture). A client application platform (e.g., a browser) then locally either interprets the portable code or translates the portable code into native machine code instructions for the client's particular instruction set architecture (ISA) prior to executing the native code.

There are many security vulnerabilities present for clients that receive and process portable code. One source of vulnerability is the design of the portable code itself. For example, the portable code may represent unsafe source language constructs that, after translation into native code instructions, will harm the client system when the instructions are executed. Another source of vulnerability is in the translation process. Interpreters and components performing translation (e.g., translators, JIT compilers, and bytecode verifiers) are large, complex software modules that are likely to have bugs, design flaws, and other features that can be exploited by malicious code.

SUMMARY

This specification describes technologies relating to providing a translation service that generates native object code by translating an intermediate representation of an application code file in a portable code format.

In general, one aspect of the subject matter described in this specification can be embodied in methods that include the actions of receiving a translation service request for a native executable for a particular instruction set architecture from a requestor, where the translation service request includes data specifying portable code in an instruction-set-neutral format; obtaining the portable code; translating the portable code into native object code for execution on the particular instruction set architecture; generating a native executable for the particular instruction set architecture; and returning the native executable to the requestor. Other embodiments of this aspect include corresponding systems, apparatus, and computer program products.

These and other embodiments can optionally include one or more of the following features. The methods can further include validating the native executable by the requestor using a trusted validator in response to receiving the native executable. Validation the native executable includes determining whether the native executable satisfies one or more code safety constraints. The requestor is a client, and the particular instruction set architecture is the client instruction set architecture. The requestor is a server that is handling a client request for the native executable, and the particular instruction set architecture is the client instruction set architecture.

In general, one aspect of the subject matter described in this specification can be embodied in methods that include the actions of receiving a translation service request for a native executable for a particular instruction set architecture from a requestor, where the translation service request includes data specifying portable code to translate; and determining whether the native executable for the particular instruction set architecture is locally stored. If the native executable is not locally stored, determining whether the portable code is locally stored and requesting the portable code from a remote server if the portable code is not locally stored; generating a native executable in response to receiving the requested portable code (generating the native executable includes translating the received portable code into native object code that is executable on the particular instruction set architecture); and returning the native executable to the requestor. Other embodiments of this aspect include corresponding systems, apparatus, and computer program products.

These and other embodiments can optionally include one or more of the following features. The actions can further include the requestor validating the native executable using a trusted validator in response to receiving the native executable. Validating the native executable includes determining whether the native executable satisfies one or more code safety constraints. The actions can further include generating the native executable using a locally stored portable code if the portable code is locally stored. The actions of translating the received portable code into native object code can include one or more optimizations. The optimizations can include optimizing the native object code to the particular instruction set. The optimizations can include optimizing the native object code to an implementation of the particular instruction set. The translation service request can indicate generating an optimized native executable that includes one or more optimizations. The actions can further include storing the generated native executable. The actions can further include returning a locally stored native executable to the requestor if the native executable for the particular instruction set architecture is locally stored.

The systems and techniques described here may provide one or more of the following advantages.

A workflow in which compilation of source code into an instruction-set-neutral intermediate representation is performed independently provides flexibility in design, development, and distribution of application programs. Source code that is developed once can be widely distributed, and translated into machine code that can execute efficiently on any of a variety of instruction set architectures (ISAs) without requiring re-compilation of the source code.

An intermediate representation of machine code instructions in an instruction-set-neutral (portable) format can be generated from input source code of any of a variety of widely-used programming languages. The instruction-set-neutral format provides a level of confidence that an application program received in that format was not designed or developed by an untrusted application provider for execution only on specific ISAs that may be favored by the application provider.

Code safety is facilitated by performing validation of the native code after it has been translated. Validation is performed locally at a client by a trusted validator that is a component of a sandbox (e.g., a component of the client runtime for ensuring code safety). Validation has minimal impact on overall system performance. A trusted validator is a small code module designed specifically for the security task at hand. Thus, a validator will tend to have fewer security vulnerabilities than an interpreter or translation components (e.g., translator, JIT compiler, and bytecode verifier), which are larger, more complex pieces of software for which security is commonly a secondary requirement compared to other features.

Ensuring safety of the native code does not depend on the components that perform the translation also being trusted components (e.g., the components being free of bugs and other exploitable features). Thus, those components can be omitted from a system's trusted code base. This permits a system using a trusted validator to maintain a smaller trusted code base than is found in commonly available systems, enhancing the general security properties of the system.

Since validation can be performed independently from translation, a client can be configured to validate a native executable that has been provided from a non-local translation process. Non-local translation of a portable executable into a native executable for a client's ISA relieves the client from performing the resource-intensive task of translation.

Non-local translation can be provided as a service that is implemented and deployed by a system, a trusted third-party service provider, or a combination. Adaptive policies can be implemented for choosing an optimal translation service provider to handle particular types of service requests. A highly-optimized version of a particular native executable can be generated and stored to enable a service to handle subsequent service requests in minimal time while still returning a high-quality result. A native executable can include optimizations that are specific to a particular implementation of an instruction set or to a particular instruction set architecture.

A translation service can apply more computing power than a local client device (e.g., a desktop computer). This allows the service to generate higher quality native code using more powerful (but also more computationally expensive) algorithms during the translation. A translation service can cache the result of earlier translations, avoiding translation and networking delays. A translation service may have a better network connection to the client than an application server, further reducing the start-up latency for an application module being distributed to the client. A translation service may also have access to profiles of earlier program executions that can be used as input to advanced optimizations for the translation process, yielding higher quality code than would be possible without the profiles. A translation service can employ advanced optimization algorithms either not available to a client or too resource-intensive for a client computing device, allowing the translation service to provide higher quality executable code than code provided by a client-side translator.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

A portable software module represented in an instruction-set-neutral code format is translated by a target system, either by compilation or interpretation, into an executable format for a particular instruction set architecture (ISA) before it can be executed. There are several major types of security vulnerabilities for a target system that receives and then executes portable software. Received portable code is not assumed to be trusted code. For example, the code may contain viruses, exploitable defects (e.g., bugs, design flaws) or other features that can make a system more vulnerable to attack when the code is executed.

The translation process can expose a variety of security vulnerabilities for the target system. In some implementations, systems perform the translation process using one or more software components (e.g., translators, just-in-time (JIT) compilers, bytecode verifiers) that are large, complex software modules that can have a high likelihood of containing exploitable features (e.g., bugs, design flaws). In addition to being translated by components likely to have exploitable features, portable code can be linked to untrusted intrinsic code libraries as it is converted.

However, using the systems and techniques described in this specification, a developer can design and write a verifiably safe software module, represent and distribute that module in a portable code format, and have the module received and translated into a native executable that is verified to execute safely on any of a wide variety of ISAs.

Figure 1:
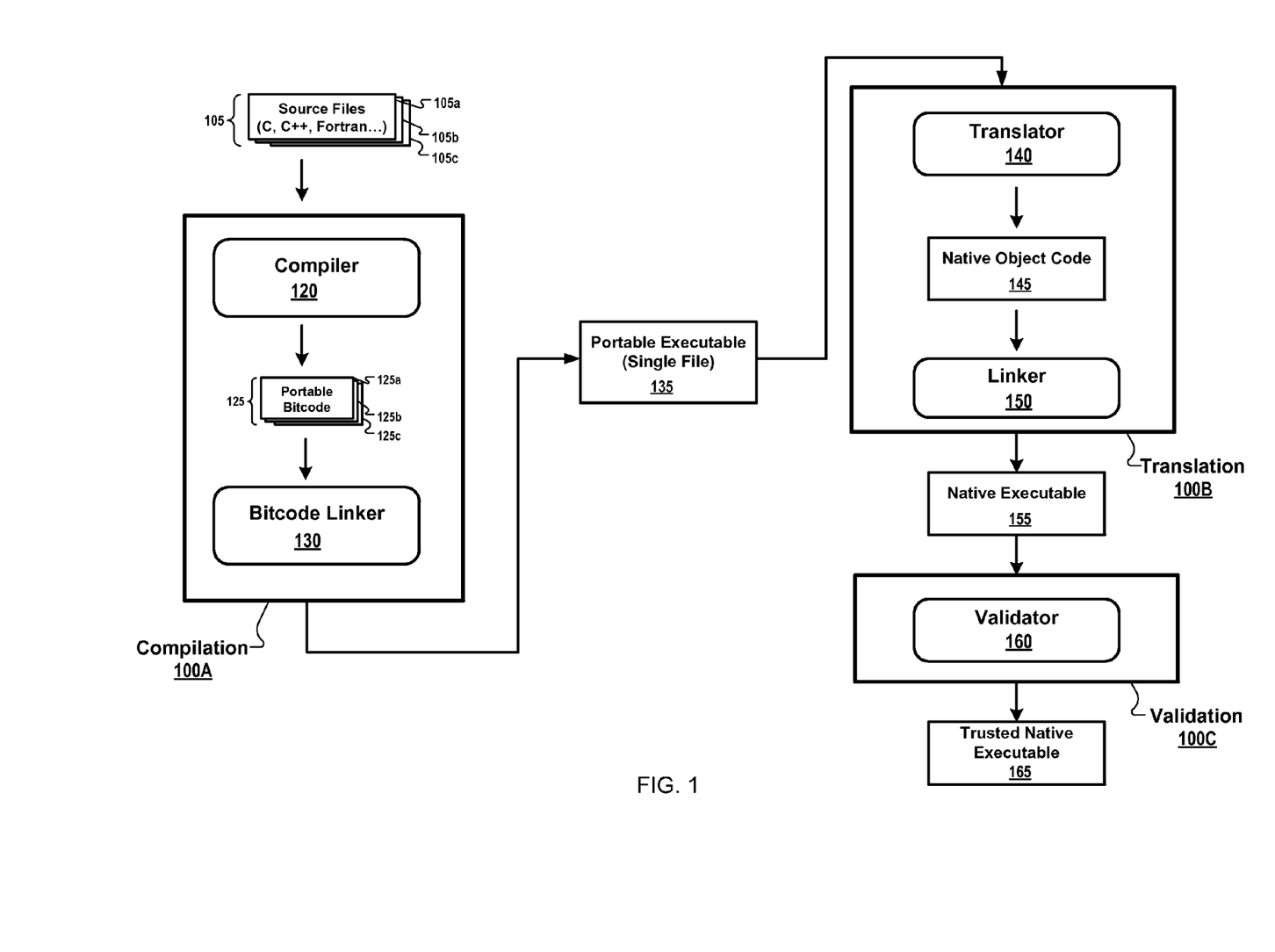
FIG. 1 illustrates a workflow through an example system for compilation of source code into portable code and translation of the portable code into validated native object code.

FIG. 1 illustrates a workflow through an example system for generation of a trusted machine code executable 155 on a particular instruction set architecture (ISA) from input source code (e.g., code written in a particular programming language). Machine code is considered to be trusted code if it has been given a guarantee of safe execution. The workflow is a three-phase process including a compilation phase 100A, a translation phase 100B, and a validation phase 100C.

The three phases are not inter-dependent, and can be implemented on different computing devices at different times. In some implementations, the translation phase 100B is implemented locally for the ISA of a computing device on which the native executable 155 will execute. In some alternative implementations, the translation phase 100B is implemented remotely on a different computing device, and a native executable 155 for a particular ISA is provided to a computing device having that particular ISA. The validation phase 100C can be implemented locally by a computing device prior to executing a native executable 155 to ensure safe execution of the machine code.

In the compilation phase 100A, a compiler 120 performs syntactic and semantic analysis of input source code files 105a, 105b, and 105c (collectively input source files 105) and generates an intermediate form of execution instructions code 125 in an ISA-neutral (portable) format. In some implementations, the generated portable code is Low-Level Virtual Machine (LLVM) bitcode that is source language independent and conforms to the open-source LLVM specification. In some implementations, the compiler 120 has one of the widely-used Gnu Compiler Collection (GCC) compiler front ends from the Gnu Project and a backend that outputs LLVM bitcode. There are GCC compiler front ends implemented for a variety of different source code languages. Therefore, an intermediate representation in a standardized portable format 125 can be generated from compiling input source code that is written in any of a large number of commonly used programming languages (e.g., C, C++, or FORTRAN). The generated intermediate representation can include multiple files (e.g., bitcode 125a, 125b, and 125c).

A linker (e.g., bitcode linker 130) generates a single portable executable file 135 by linking one or more generated portable code files 125 with one or more libraries of system-level instructions that define aspects of code execution environments.

The portable executable file establishes an environment that defines many of the characteristics of a platform architecture on which the program can run. Some examples of these characteristics include: the width in bits of a pointer; the encoding of multibyte integers (byte order); the inventory and behavior of system calls provided by the operating system; the memory model governing the apparent order of loads and stores from memory; and the memory layout of record types.

In the translation phase 100B, a translator 140 converts a portable executable file into native code instructions 145 for a particular ISA. A linker 150 generates a native executable 155 by linking the native code instructions 145 with one or more local native system libraries.

In the validation phase 100C, a trusted validator 160 validates a native executable 155 to ensure its code safety prior to its execution. If the validator 160 determines that the native executable satisfies a set of code safety constraints, the native executable is trusted 165 and can be executed.

Figure 2:
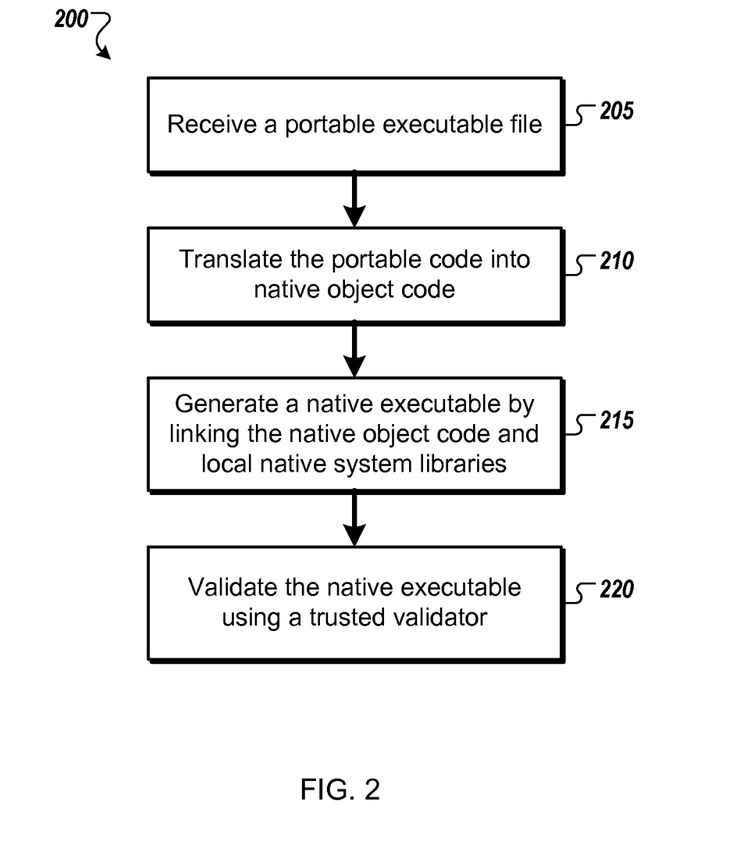
FIG. 2 is a flow diagram of an example method for translating received portable executable code into a validated native executable.

FIG. 2 is a flow diagram of an example method 200 for generating a trusted native executable for a particular ISA after translating portable executable code. For convenience, method 200 will be described with respect to a system that includes one or more computing devices and performs the method 200. Specifically, the method 200 will be described with respect to workflow phases 100B and 100C of FIG. 1.

The system receives 205 a portable executable file (e.g. the portable executable file 135). In some implementations, the received portable executable file is generated by a system implementing workflow compilation phase 100A. In some implementations, the received portable executable file is generated by the same system that generates the native executable. In some alternative implementations, the portable executable file is generated by a second remote system. In some other implementations, the portable executable file was generated at an earlier time and is retrieved from storage.

The system uses a translator (e.g., translator 140) to generate 210 native object code instructions (e.g., native object code 145) by converting the portable code into native machine code instructions that are executable by a particular ISA. In some implementations, the native machine code may be an Executable and Linkable Format (ELF) executable or an ELF shared object. In some implementations, the translator includes an optimizer that improves the execution performance of the generated native object code on its particular ISA. A linker (e.g., linker 150) links the native machine code with one or more native system libraries and generates a native executable (e.g., native executable 155) that can be run directly on a computing platform having the ISA.

In some implementations, the translator includes an optimizer that improves the execution performance of the generated native object code on a particular ISA. The system generates 215 the native executable by linking the native object code with intrinsic system native code libraries using a linker.

The system validates 220 a generated native executable using a trusted validator (e.g., validator 160) in order to provide a guarantee of the machine code safety prior to its being executed. In some implementations, validation is performed by a trusted validator component of a sandbox within the system's local execution environment.

Sandboxing, or safe confinement of software behavior, is a technique for providing safety guarantees when executing untrusted software. Code can be analyzed using a validator to ensure that the code satisfies a set of code safety constraints defined by the sandbox execution environment. Code validation itself is an efficient process, providing minimal performance overhead. Sandboxing can be language-independent, so that the verifiably safe native code safety constraints do not restrict the choice of an implementation language. One example of a sandboxing system is Native Client (NaCl). Native Client is a Software Fault Isolation (SFI)-based system for providing a trusted sandbox and machine code safety guarantees based on static analysis of verifiably safe machine code, which is described, for example, in D. Sehr, R. Muth, C. Biffle, V. Khimenko, E. Pasko, K. Schimpf, B. Yee, and B. Chen, "Adapting Software Fault Isolation to Contemporary CPU Architectures," 19th USENIX Security Symposium 2010.

In some implementations, for example, the system is a Portable Native Client (PNaCl) system that uses a Native Client validator.

Figure 3:
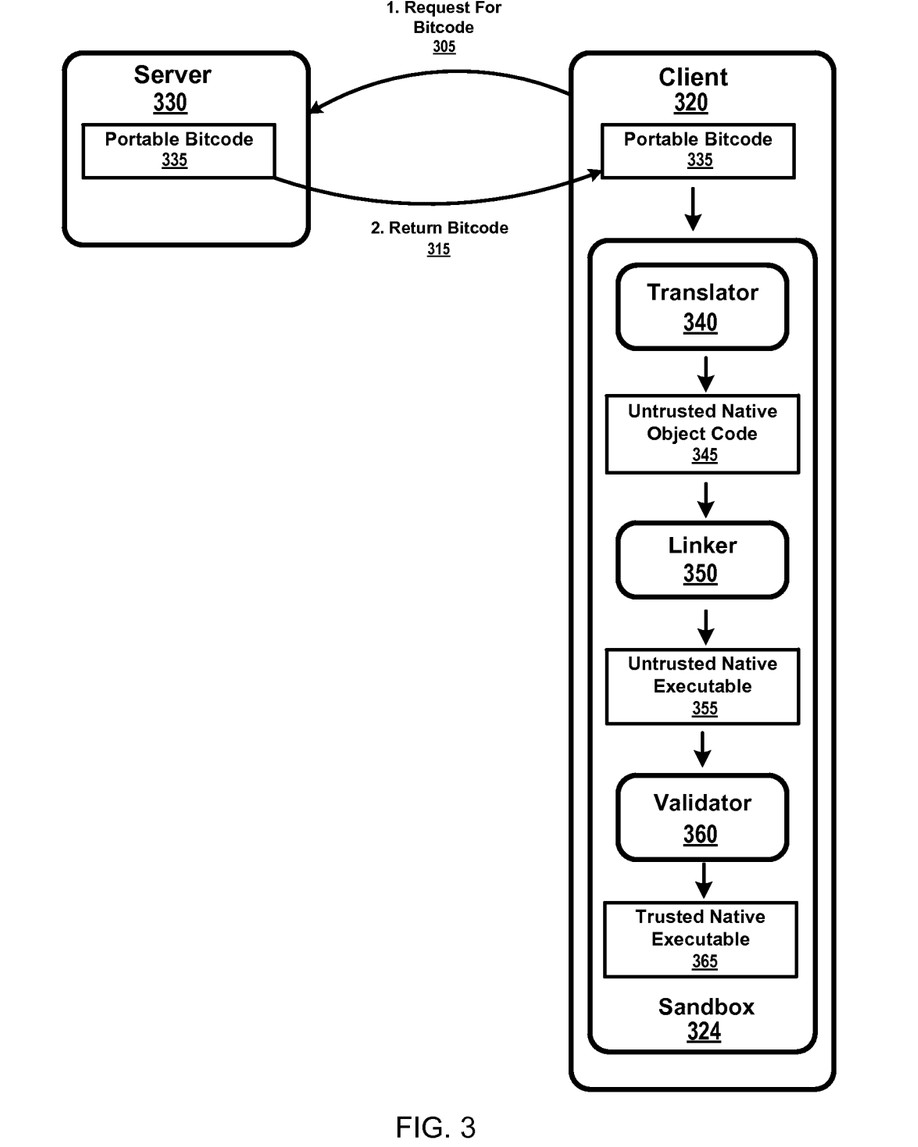
FIG. 3 illustrates an example scenario in which a client is configured to locally translate a received portable code file into a validated native executable.

FIG. 3 illustrates an example system in which a client 320 is configured to locally translate a portable code file 335 into a trusted native executable 365 for the client's own instruction set architecture. The portable code file 335 is received (315) by the client 320 in response to the client 320 requesting (305) the file from a server 330.

The execution environment on the client 320 is further configured to include a sandbox 324 (e.g., a Native Client sandbox), and to perform the local translation of the portable code file 335 within the sandbox 324. The components performing the translation (e.g., a translator 340 and a linker 350) are not assumed to be trusted components (e.g., assumed to be free of bugs and design flaws), and thus the native executable 355 generated from the translation process also is not assumed to be trusted. Prior to execution of the executable within the sandbox 324, a trusted validator 360 component of the sandbox 324 is used to analyze the generated machine code to ensure that the code satisfies the safety constraints of the sandbox. Only a validated, and therefore trusted, native code executable 365 is executed by the client.

In some implementations, the client validates an executable locally to ensure its code safety, but the resource-intensive task of translation from portable code into machine code for the client's ISA (e.g., phase 100B, FIG. 1) is not performed on the client. In some implementations, translation of portable code is performed by a remote translation service that handles translation service requests for native executables. A translation service can have different types of deployment (e.g., as a web service or as a locally hosted program), and can be hosted by a client, by a server, or by one or more computing devices hosted by a third party.

In some implementations, a client is configured to use a particular translation service. In some alternative implementations, a client selects a non-local translation service from a whitelist of available translation services. In some implementations, the choice of translation service is explicitly determined at the time the translation request is generated. In some alternative implementations, the choice of which translation service to use is based on a user-settable configuration state. In yet other implementations, a client submits translation requests to a specified default translation service. Some example criteria for selecting a particular translation service include selecting a translation service that provides a native executable that is highly optimized for a particular ISA; selecting a designated alternate translation service for a default translation service that is temporarily unavailable; selecting a translation service required by a corporate security policy; and performing evaluation testing of a new translation service.

Figure 4A:
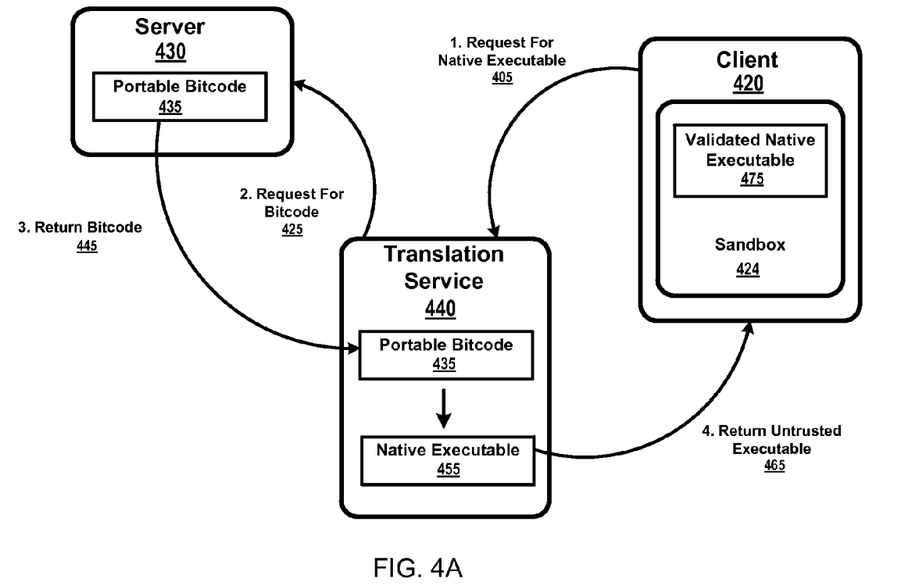
FIG. 4A illustrates an example scenario in which a server uses a non-local translation service to handle a client request for a native executable.
Figure 4B:
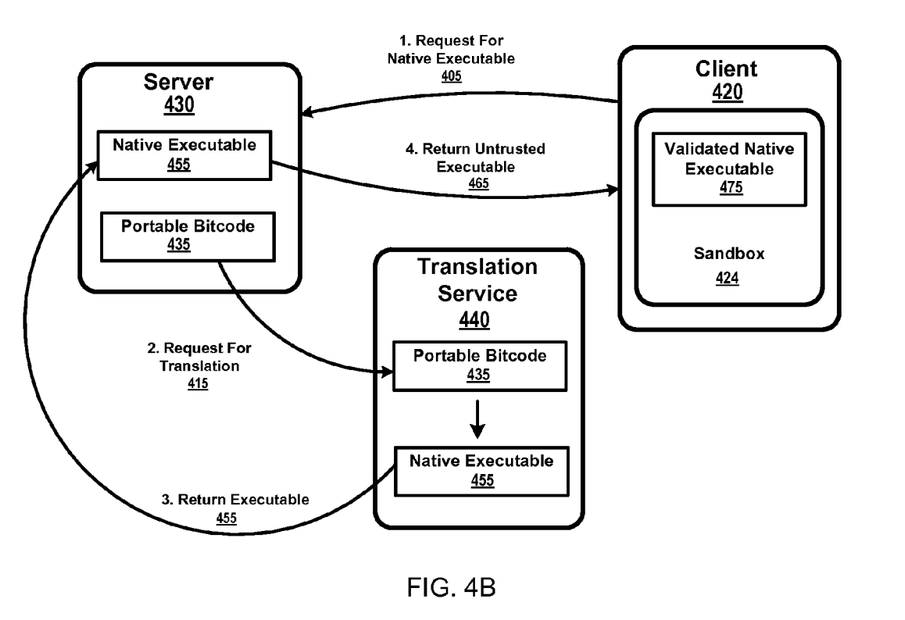
FIG. 4B illustrates an example scenario in which a non-local translation service handles a client request for a native executable.

FIG. 4A and FIG. 4B illustrate two examples of system configurations in which translation of a portable code executable into a native executable for a particular ISA is provided by a non-local translation service 440.

As illustrated in FIG. 4A and FIG. 4B, the native executable 455 returned to a client is not assumed to be trusted, and a client 420 can ensure the code safety of the received native executable prior to its execution by validating the native code 475 locally. In some implementations, the client 420 execution environment includes a sandbox 424 in which an executable that is received from a translation service is validated and executed.

FIG. 4A illustrates an example scenario in which a non-local translation service 440 handles a client request (405) for a native executable. In the example, the translation service 440 handles the client request by translating a portable application file 435 it has requested (425) and received (445) from a remote application provider 430. In some implementations, the application provider 430 can receive and store updated versions of the portable code, ensuring that the latest portable version of an application (435) is translated in response to each client request (405). In some implementations, a non-local translation service 440 stores native executables that have been generated from prior translations, and handles a client request (405) by returning (465) a stored native executable. In some other implementations, the translation service 440 can generate an optimized version of the native executable, replace a stored native executable with an optimized version, and handle subsequent client requests (405) for the native executable by returning (465) the optimized version.

FIG. 4B illustrates an example scenario in which a server 430 handles a client request (405) for a native executable by using a non-local (e.g., a third party) translation service 440 to translate a stored portable code file 435 into the requested native executable. In some implementations, the server 430 handles the client request (405) by invoking (415) the translation service 440 to generate a native executable 455 to return (465) to the client. In some alternative implementations, the server 430 can invoke the third party translation service 440 to translate one particular portable code file into multiple native executables, each for a different ISA. The server 430 handles the client request (405) by selecting a stored native executable 455 to return (465) based on data included with the client request (405) (e.g., the client request specifies a particular ISA).

In some alternative implementations, a server 430 can request an optimized, higher-quality native executable from the translation service 440 in response to client request (405) for an optimized native executable. In some other implementations, a server 430 can initiate a request to the translation service 440 for an optimized, higher-quality native executable. The server can store the higher-quality native executable, and handle subsequent client requests (405) for the native executable by returning (465) the stored native executable. This ensures that the server's handling of a client request (405) can occur within a minimal response time and avoid the additional performance overhead to produce an optimized native executable.

Figure 5:
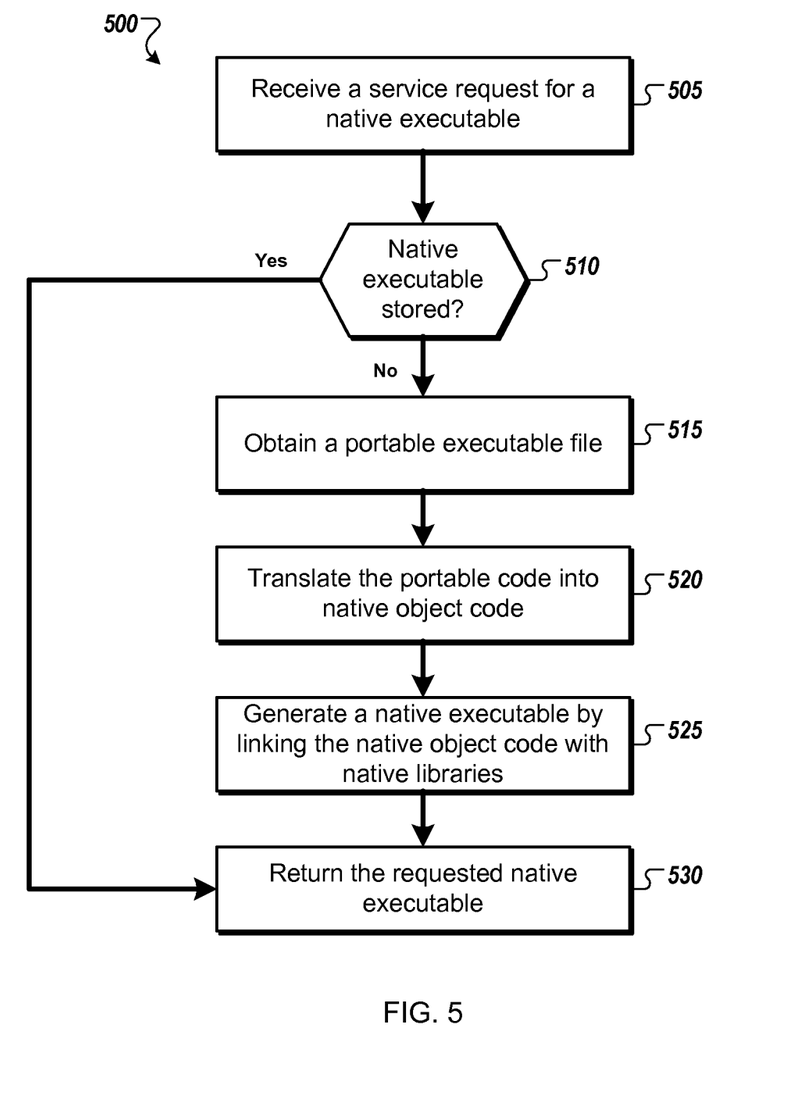
FIG. 5 is a flow diagram of an example method for handling a translation service request.

FIG. 5 is a flow diagram of an example method 500 for handling a translation service request. For convenience, method 500 will be described with respect to a system that includes one or more computing devices and performs the method 500. In some implementations, the method 500 is performed by a translation service (e.g., non-local translation service 440 in FIG. 4A and FIG. 4B).

The system receives 505 a request for a particular native executable. If the system is implemented as a locally hosted translation service, the request can be received from a software module that is executing on the same device. If the system is implemented as a non-local translation service, the request can be received over a network from a client (e.g., client 420 of FIG. 4A), or, alternatively from a server (e.g., server 430 of FIG. 4B). As described with respect to FIG. 4A and FIG. 4B, one or more previously generated native executable files can be stored. If the system determines 510 that a particular requested native executable file is stored, the received request is handled by returning the stored native executable to the requestor.

If the system determines 510 that the requested native executable is not stored, the system obtains 515 a portable code file, and translates 520 the portable code file into native object code. As described with respect to FIG. 4A, the portable code file can be stored locally or retrieved from a remote server (e.g., server 430 of FIG. 4A). Alternatively, the portable code file can be included in the service request. In some implementations, translating portable code into native object code includes optimization for performance. For example, native code can be optimized for performance on a particular architecture. Additionally, native object code can be optimized to a particular instruction set implementation (e.g., specialized to cache size, or specialized for cycle latencies for particular instructions).

The system generates 525 a native executable by linking the native object code with one or more native system code libraries. The system returns 530 the generated native executable to the requestor. The generated native executable is not assumed to be trusted. In some implementations, the requestor is a client (e.g., client 420 of FIG. 4A and FIG. 4B) having an execution environment that includes a sandbox (e.g., sandbox 424 of FIG. 4A and FIG. 4B), and the native executable is validated locally by the client using a local trusted validator.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, (e.g., a machine-generated electrical, optical, or electromagnetic signal) that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a request from a requestor for a trusted native executable for particular source code for a particular instruction set architecture;
   receiving, at a translation service, a linked combination of (a) portable code that has been compiled from the particular source code and (b) one or more libraries of system-level instructions that define constraints of code execution environments for the trusted native executable, wherein the combination is source language independent and in an instruction-set neutral format;
   translating the portable code and the linked one or more libraries into native object code for execution on the particular instruction set architecture;
   generating the trusted native executable, by linking the native object code with one or more native system code libraries, for execution on the particular instruction set architecture;
   and
   returning the trusted native executable in a response to the request.

2. The method of claim 1, further comprising validating the trusted native executable by the requestor using a trusted validator in response to receiving the trusted native executable.

3. The method of claim 2, where validating the trusted native executable includes determining whether the trusted native executable satisfies one or more code safety constraints.

4. The method of claim 1, where the requestor is a client.

5. The method of claim 4, where the particular instruction set architecture is an instruction set architecture of the client.

6. The method of claim 1, where the requestor is a server that is handling the request for the trusted native executable for a client.

7. The method of claim 6, where the particular instruction set architecture is an instruction set architecture of the client.

8. A system comprising:
   one or more computers and one or more non-transitory storage devices storing instructions that are operable, when executed by the one or more computers, to cause the one or more computers to provide:
   a translation service configured to receive requests from a requestor, wherein the translation service performs operations comprising:
   receiving a request from the requestor for a trusted native executable for particular source code for a particular instruction set architecture;
   receiving a linked combination of (a) portable code that has been compiled from the particular source code and (b) one or more libraries of system-level instructions that define constraints of code execution environments for the trusted native executable, wherein the combination is source language independent and in an instruction-set neutral format;
   translating the portable code and the linked one or more libraries into native object code for execution on the particular instruction set;
   generating the trusted native executable, by linking the native object code with one or more native system code libraries, for execution on the particular instruction set architecture; and
   returning the trusted native executable in a response to the request.

9. The system of claim 8, where the operations further comprise validating the trusted native executable by the requestor using a trusted validator in response to receiving the trusted native executable.

10. The system of claim 9, where validating the trusted native executable includes determining whether the trusted native executable satisfies one or more code safety constraints.

11. The system of claim 8, where the requestor is a client.

12. The system of claim 11, where the particular instruction set architecture is an instruction set architecture of the client.

13. The system of claim 8, where the requestor is a server that is handling the request for the trusted native executable for a client.

14. The system of claim 13, where the particular instruction set architecture is an instruction set architecture of the client.

15. A non-transitory computer storage medium, encoded with a computer program, the program comprising instructions that when executed by one or more computers cause the one or more computers to provide:
   a translation service configured to receive requests from a requestor, wherein the translation service performs operations comprising:
   receiving a request from the requestor for a trusted native executable for particular source code for a particular instruction set architecture;
   receiving a linked combination of (a) portable code that has been compiled from the particular source code and (b) one or more libraries of system-level instructions that define constraints of code execution environments for the trusted native executable, wherein the combination is source language independent and in an instruction-set neutral format;
   translating the portable code and the linked one or more libraries into native object code for execution on the particular instruction set architecture;
   generating the trusted native executable, by linking the native object code with one or more native system code libraries, for execution on the particular instruction set architecture;
   and
   returning the trusted native executable in a response to the request.

16. The computer storage medium of claim 15, where the operations further comprise:
   validating the trusted native executable by the requestor using a trusted validator in response to receiving the trusted native executable.

17. The computer storage medium of claim 16, where validating the trusted native executable includes determining whether the trusted native executable satisfies one or more code safety constraints.

18. The computer storage medium of claim 15, where the requestor is a client.

19. The computer storage medium of claim 18, where the particular instruction set architecture is an instruction set architecture of the client.

20. The computer storage medium of claim 15, where the requestor is a server that is handling the request for the trusted native executable for a client.

21. The computer storage medium of claim 20, where the particular instruction set architecture is an instruction set architecture of the client.

22. A method performed by data processing apparatus, the method comprising:
   receiving a request from a requestor for a trusted native executable for particular source code for a particular instruction set architecture;
   determining whether the trusted native executable for the particular instruction set architecture is locally stored;
   if the trusted native executable is not locally stored,
      determining whether portable code that has been compiled from the particular source code is locally stored;
      requesting the portable code from a remote server if the portable code is not locally stored;
      receiving a linked combination of (a) the portable code and (b) one or more libraries of system-level instructions that define constraints of code execution environments for the trusted native executable, wherein the combination is source language independent and in an instruction-set neutral format;
      translating the portable code and the linked one or more libraries into native object code for execution on the particular instruction set architecture;
      generating the trusted native executable, by linking the native object code with one or more native system code libraries, for execution on the particular instruction set architecture; and
      returning the trusted native executable in a response to the request.

23. The method of claim 22, further comprising validating the trusted native executable by the requestor using a trusted validator in response to receiving the trusted native executable.

24. The method of claim 23, where validating the trusted native executable includes determining whether the trusted native executable satisfies one or more code safety constraints.

25. The method of claim 22, further comprising, if the portable code is locally stored, generating the trusted native executable using the locally stored portable code.

26. The method of claim 22, where translating the portable code into native object code includes one or more optimizations.

27. The method of claim 26, where the one or more optimizations include optimizing the native object code to the particular instruction set architecture.

28. The method of claim 26, where the one or more optimizations include optimizing the native object code to an implementation of the particular instruction set architecture.

29. The method of claim 26, where the request indicates generating an optimized native executable that includes the one or more optimizations.

30. The method of claim 26, further comprising storing the generated trusted native executable.

31. The method of claim 22, further comprising returning a locally stored trusted native executable in a response to the request if the trusted native executable for the particular instruction set architecture is locally stored.

32. A system comprising:
   one or more computers and one or more non-transitory storage devices storing instructions that are operable, when executed by the one or more computers, to cause the one or more computers to provide:
   a translation service configured to receive requests from requestors, wherein the translation service performs operations comprising:
   receiving a request from a requestor for a trusted native executable for particular source code for a particular instruction set architecture;
   determining whether trusted native executable for the particular instruction set architecture is locally stored;
   if the trusted native executable is not locally stored,
   determining whether portable code that has been compiled from the particular source code is locally stored;
   requesting the portable code from a remote server if the portable code is not locally stored;
   receiving a linked combination of (a) the portable code and (b) one or more libraries of system-level instructions that define constraints of code execution environments for the trusted native executable, wherein the combination is source language independent and in an instruction-set neutral format;
   translating the portable code and the linked one or more libraries into native object code for execution on the particular instruction set architecture;
   generating the trusted native executable, by linking the native object code with one or more native system code libraries, for execution on the particular instruction set architecture; and
   returning the trusted native executable in a response to the request.

33. The system of claim 32, where the operations further comprise:
   validating the trusted native executable by the requestor using a trusted validator in response to receiving the trusted native executable.

34. The system of claim 33, where validating the trusted native executable includes determining whether the trusted native executable satisfies one or more code safety constraints.

35. The system of claim 32 where the operations further comprise:
   if the portable code is locally stored, generating the trusted native executable using the locally stored portable code.

36. The system of claim 32, where performing the operations of translating the portable code into the native object code includes one or more optimizations.

37. The system of claim 36, where the one or more optimizations include optimizing the native object code to the particular instruction set architecture.

38. The system of claim 36, where the one or more optimizations include optimizing the native object code to an implementation of the particular instruction set.

39. The system of claim 36, where the request indicates generating an optimized native executable that includes the one or more optimizations.

40. The system of claim 36, where the operations further comprise:
storing the generated trusted native executable.

41. The system of claim 32, where the operations further comprise:
returning a locally stored trusted native executable in a response to the request if the trusted native executable for the particular instruction set architecture is locally stored.

42. A non-transitory computer storage medium, encoded with a computer program, the program comprising instructions that when executed by one or more computers cause the one or more computers to provide:
a translation service configured to receive requests from requestors, wherein the translation service performs operations comprising:
receiving a request from a requestor for a trusted native executable for particular source code for a particular instruction set architecture;
determining whether the trusted native executable for the particular instruction set architecture is locally stored,
if the trusted native executable is not locally stored,
determining whether portable code that has been compiled from the particular source code is locally stored;
requesting the portable code from a remote server if the portable code is not locally stored;
receiving a linked combination of (a) the portable code and (b) one or more libraries of system-level instructions that define constraints of code execution environments for the trusted native executable, wherein the combination is source language independent and in an instruction-set neutral format;
translating the portable code and the linked one or more libraries into native object code for execution on the particular instruction set architecture;
generating the trusted native executable, by linking the native object code with one or more native system code libraries, for execution on the particular instruction set architecture; and
returning the trusted native executable in a response to the request.

43. The computer storage medium of claim 42, where the operations further comprise:
validating the trusted native executable by the requestor using a trusted validator in response to receiving the trusted native executable.

44. The computer storage medium of claim 43, where validating the trusted native executable includes determining whether the trusted native executable satisfies one or more code safety constraints.

45. The computer storage medium of claim 42 where the operations further comprise:
if the portable code is locally stored, generating the trusted native executable using the locally stored portable code.

46. The computer storage medium of claim 42, where performing the operations of translating the portable code into the native object code includes one or more optimizations.

47. The computer storage medium of claim 46, where the one or more optimizations include optimizing the native object code to the particular instruction set architecture.

48. The computer storage medium of claim 46, where the one or more optimizations include optimizing the native object code to an implementation of the particular instruction set architecture.

49. The computer storage medium of claim 46, where the request further indicates generating an optimized native executable that includes the one or more optimizations.

50. The computer storage medium of claim 46, where the operations further comprise:
storing the generated trusted native executable.

51. The computer storage medium of claim 42, where the operations further comprise:
returning a locally stored trusted native executable in a response to the request if the trusted native executable for the particular instruction set architecture is locally stored.

* * * * *